Figure 1:
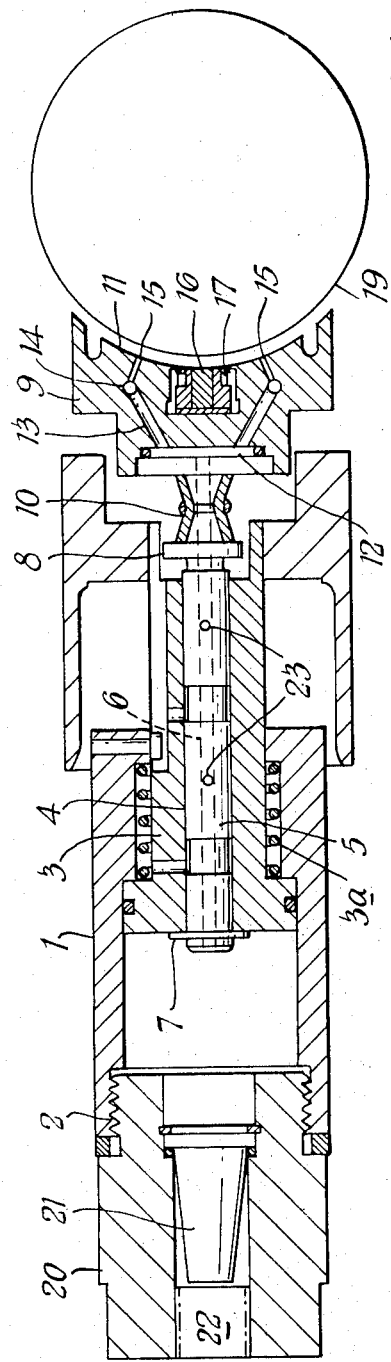

United States Patent [19]
Mitchie et al.

[11] 3,857,095
[45] Dec. 24, 1974

[54] METHOD AND APPARATUS FOR MEASURING THE THICKNESS OF A COATING ON A SUBSTRATE

[75] Inventors: Robert Edward Mitchie, Weybridge; Peter Michael Hyatt Price, Virginia Water, both of England

[73] Assignee: Vickers Limited, London, England

[22] Filed: July 25, 1972

[21] Appl. No.: 275,109

[30] Foreign Application Priority Data
July 26, 1971 Great Britain.................... 35047/71

[52] U.S. Cl........... 324/71 R, 324/61 R, 324/34 TK
[51] Int. Cl....................... G01n 27/00, G01r 33/00
[58] Field of Search....... 324/71 R, 61 R, 59, 34 TK

[56] References Cited
UNITED STATES PATENTS

| | | | |
|---|---|---|---|
| 1,946,924 | 2/1934 | Allen et al. | 33/125 |
| 3,227,951 | 1/1966 | Dykaar | 324/61 |
| 3,528,002 | 9/1970 | Dunlavey | 324/34 |
| 3,584,579 | 6/1971 | Rothenberg | 324/61 X |

Primary Examiner—Alfred E. Smith
Assistant Examiner—Rolf Hille
Attorney, Agent, or Firm—Nichol M. Sandoe

[57] ABSTRACT

The thickness of a coating, such as an ink film, on a substrate, such as a printing surface, is determined by supporting a transducer on a cushion of gas at a constant distance from the surface of the coating of the coated substrate as the coated substrate is moved past the transducer. The transducer is of the type which has an electrical property which varies in dependence on the proximity of the transducer to a surface of electrically conductive material and the presence of the coating on the substrate causes a variation in the distance between the transducer and a surface of electrically conductive material (which may be the surface of the substrate) in accordance with the coating thickness. The resultant change in electrical property is determined and is a measure of the coating thickness. When applying coatings, the amount of coating material applied to a subsequent portion of the substrate may be regulated in dependence on the thickness of the coating on a preceding portion of the substrate so that the thickness of the coating on the subsequent portion of the substrate is equal to a desired thickness.

12 Claims, 4 Drawing Figures

PATENTED DEC 24 1974

3,857,095

SHEET 1 OF 2

METHOD AND APPARATUS FOR MEASURING THE THICKNESS OF A COATING ON A SUBSTRATE

This invention relates to coating and is concerned with the determination of coating thicknesses and, primarily, with the determination of coating thicknesses during coating.

According to one aspect of the present invention there is provided a method of determining the thickness of a coating on the surface of a substrate, which method comprises:

i. effecting relative movement between the coated substrate and a displacement transducer having an electrical property which varies in dependence on its proximity to electrically conductive material, ii. supporting the transducer by means of a cushion of a gas so that the transducer is spaced from the surface of the coating of the relatively moving coated substrate by a constant distance and is spaced from a surface of an electrically conductive material by a distance which varies in dependence on the thickness of the coating of the relatively moving coated substrate, and iii. measuring the variation in said electrical property of the transducer as the distance separating the transducer and the surface of electrically conductive material varies to obtain a measure of the thickness of the coating.

According to another aspect of the present invention there is provided a device for determining the thickness of a coating on the surface of a substrate, which device comprises i. a support member to be secured adjacent to the substrate, ii. a pad-like element axially moveable with respect to the member towards or away from the substrate in use, which element has a face provided with gas discharge outlets and includes a transducer having an electrical property which is dependent upon its proximity to an electrically conductive material, iii. a means of displacing the element axially with respect to the member towards the substrate in use, and iv. a means of conducting gas to the discharge outlets to maintain the face of the element at a constant distance from the surface of the coating on the substrate.

The surface of the substrate carrying the coating may, if formed of a suitable material, constitute the surface of electrically conductive material. On the other hand, in the case where the substrate surface carrying the coating of which the thickness is to be measured is non-electrically conductive, it is necessary to provide an additional surface which is formed of electrically conductive material and which is in a fixed relationship with respect to the plane of the surface of the substrate so that the transducer is spaced from the additional surface, as well as from the relatively moving substrate surface carrying the coating, by a distance dependent on the thickness of the coating. This can conveniently be done by disposing an electrically conductive pad or roller on that side of the non-electrically conductive surface remote from the transducer. In this case, the total thickness of the nonelectrically conductive substrate and the coating are measured.

The present invention is particularly suitable for determining the thickness of an ink film present as a coating on a moving substrate, e.g. on a printing roller, during printing. However, the present invention is of use in determining the thickness of other materials coated on other substrates. For example, the device of the present invention can be used to determine the thickness of a film, e.g. of paint or plastics material, applied to a flat web, e.g. tin plate, the thickness of proofing materials applied to fabrics, or the thickness of coatings applied to paper. If a low frequency (50 Hz) transducer is used, the present invention can be employed to measure the thickness of metal coatings on steel e.g. in galvanising and tinning operations. Further, by making use of two devices of the invention mounted on opposite sides of a web, e.g. tin plate, coated on both sides it is possible to determine the thickness of the coating applied to each side. Alternatively, in the case where both sides of a web of non-electrically conductive material are to be coated, one such device may be disposed on one side of the web and for example, a metallic air bearing pad (i.e., of a structure somewhat similar to the device of the present invention but not including the transducer) may be disposed on the other side of the web to serve as a "counterface" and constitute the required surface of electrically conductive material. In this case, the total thickness of the web and both coatings is measured.

If desired the present invention can be used to control as well as to determine the thicknesses of coatings being applied to a moving substrate. For example, the variation in the electrical property of the transducer, as the distance between the transducer and the surface of electrically conductive material varies, can be operably linked to the means applying the coating material to the substrate so that the amount of coating material applied to a subsequent portion of the substrate by said means is dependent upon the actual thickness of the coating applied to a previous portion of the substrate as continuously determined in accordance with the present invention. In a preferred embodiment of this technique, the present invention is used in a printing machine to measure the amount of ink actually present on a roller supplying ink to the printing roller of the machine. The printing machine includes a means which effectively compares the amount of ink actually present, as determined in accordance with the present invention, with the amount of ink desired to be present and then causes the speed control unit of the motor driving an ink supplying roller to increase or decrease the speed of the motor, as the case may be, independence upon the difference, if any, between the actual and desired amounts of ink present so that ink is subsequently applied in an amount which is equal to the desired amount.

Figure 3:
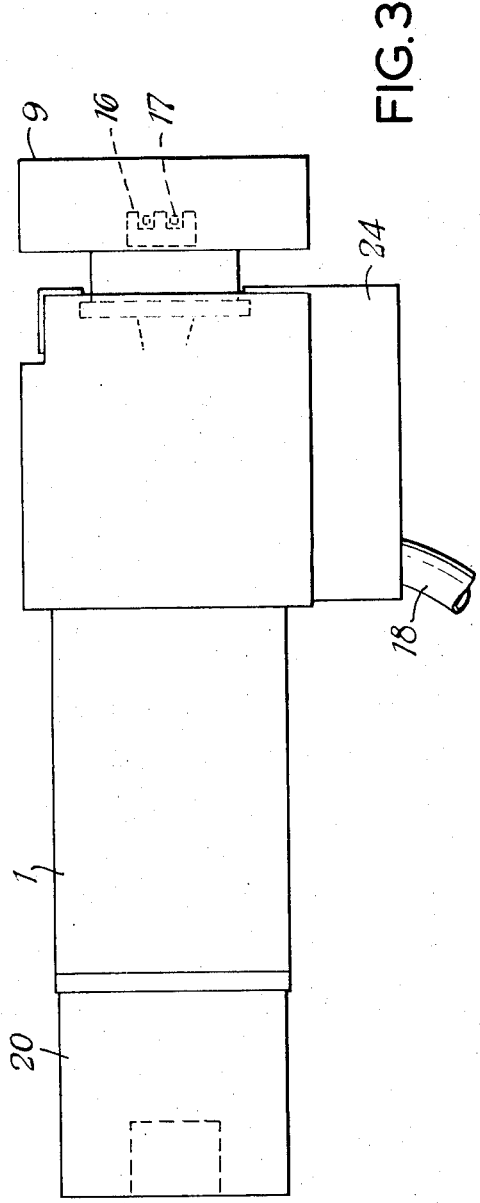
Figure 2:
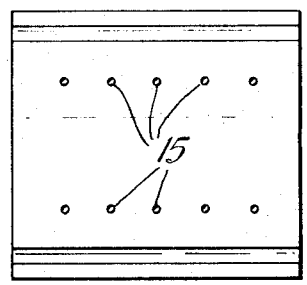
Figure 4:
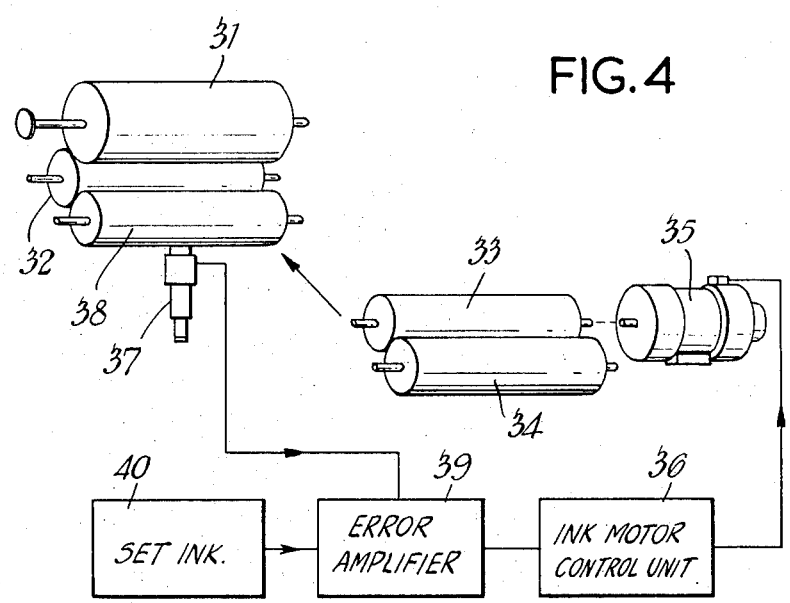

For a better understanding of the invention and to show how the same may be carried into effect, reference will now be made, by way of example, to the accompanying drawings in which:

FIG. 1 is an axial section of a device in accordance with the present invention, FIG. 2 is an end view of the device of FIG. 1, FIG. 3 is a plan view of the device of FIGS. 1 and 2, and FIG. 4 is a schematic representation of a printing machine including a device as shown in FIGS. 1 to 3.

Referring to FIGS. 1 to 3, the device comprises a support member 1 in the form of an open ended tube provided with a threaded aperture 2. A first piston 3 is slidably located within the support member 1, the spring 3a being arranged so that it normally urges the piston 3 towards that end of the support member 1 provided with the aperture 2. The first piston 3 includes an axial bore 4 carrying an axially displaceable second piston 5. The second piston 5 includes an axial bore 6 and is secured by a circlip 7. The circlip 7 serves as an end stop to limit the axial movement in one direction of the second piston 5 within the bore 4. An end stop in the form of a flange 8 is provided nearer the second end of the piston 5 to limit axial displacement of the piston 5 in the bore 4 in the other direction. The second end of the second piston 5 is secured to a pad-like element 9 by means of a flexible joint 10, preferably in the form of a ball and socket or a rubber linkage. The element 9 has an end face 11 and includes an air chamber 12 in communication with the bore 6 of the second piston 5. Conduits 13 lead from the chamber 12 to two air galleries 14 which communicate with the end face 11 of the element 9 via first and second series of linearly arranged air passages 15. Located between the series of passages is an inductive type-non-contact displacement transducer having a resolution of about 0.5 micro metre ($\mu$m) and a range of about 200 micro metres and comprising an E-shaped ferrite core 16 and a coil 17 wound around the core. The coil is connected electrically to a conventional oscillator circuit (not shown) contained in housing 24. The oscillator circuit operates at a high frequency (e.g. about 2 M Hz) and the frequency of the oscillator circuit is dependent upon the inductance of the coil. A cable 18 extends from the oscillator circuit to a transducer read-out unit (not shown) known as Type M 1861 of Shandon Southern Instruments Limited and which is a conventional means of detecting change in frequency. The transducer read-out unit converts the frequency to a meter reading.

The end face 11 of the element is profiled in conformity with the shape of a copper plated roller 19 constituting the printing surface with which the device is to be used. The end face 11 is about 50 mm wide and extends for about 45 mm around the circumference of the roller depending upon the circumference of the roller. A housing 20 containing a filter 21 is screwed into the threaded aperture 2. The housing 20 is provided with a threaded aperture 22.

In use, the device is mounted adjacent the surface of the roller 19 so that the axis of the device is normal thereto and the support member 1 is secured at a fixed distance away from the surface of the roller. An air line is screwed into the aperture 22 in the housing 20 and air is introduced via the aperture 22 into the device at a pressure of about $2 \times 10^5$ Newtons per square metre (30 psi). Air passing into the device exerts a force on the first piston 3 and displaces the same axially within the support member 1 towards the roller surface. The displacement of the first piston 3 under air pressure is limited by a flange on the piston 3 which co-operates with an internal shoulder in the support member 1. The support member 1 is mounted relative to the roller 19 such that when the first piston 3 is held against the internal shoulder of the support member 1, the second piston 5 is clear of both of its end stops. The air entering the device also exerts a force on the second piston 5 and displaces the same, and hence the element 9, towards the roller surface and, in addition, air passes through the central bore 6 of piston 5 into the air chamber 12, along the conduits 13 and air galleries 14, and escapes from the end of the element 9 via the air passages 15. Thus, a cushion of air is provided between the end face 11 of the element and the roller surface. The air passages 15 are sufficiently small to ensure that the thickness of the air film escaping across the end face 11 (i.e., between the end face 11 and the roller) is, for any given pressure in the galleries 14, dependent on the load applied to the element 9 by the piston 5. Hence the device resembles a conventional pressure fed air bearing. The overall affect of the air entering the device is for the end face 11 to be maintained at a distance of about 100 micro metres away from the roller surface. By maintaining the air supply constant, the end face 11 of the element 9 remains at a fixed distance from the roller surface. When the element 9 is at this fixed distance, the output of the displacement transducer is set to zero. During printing, ink is applied to the surface of the rotating roller and forms a film thereon. However, the thickness of the air film supporting the pad-like element 9 remains constant and hence the second piston 5 carrying the element 9 is axially displaced within the device away from the roller surface so that the distance between the end face 11 and the surface of the ink on the roller is the same as was the distance between the end face 11 and the surface of the roller when no ink was present. The distance by which the second piston 5 is so displaced depends upon the thickness of the ink on the roller surface. As a result of this displacement of the second piston 5, the transducer in the pad-like element 9 moves away from the copper surface of the roller and hence the inductance of the transducer changes. This change in inductance alters the frequency of the oscillator circuit and the change in frequency is shown as a meter reading on the transducer read-out unit. The value of this meter reading is dependent on the change in inductance as the pad-like element 9 is displaced from the position it occupies when no ink is on the roller. Hence the value of the meter reading is a measure of the thickness of the ink film on the roller surface.

The flexible joint 10 between the second piston 5 and the pad-like element 9 is provided so as to allow the element to follow any slight movement of the roller in its bearings or any slight movement of the roller due to it being mounted slightly eccentrically.

Preferably, and as shown, the device is constructed in a manner such that when the air supply to the device is turned off, the first piston 3 retracts into the support member 1 under the influence of its return spring and hence the pad-like element 9 is pulled back from the roller surface. This facilitates cleaning of the roller surface and the element 9 if desired.

Preferably, and as shown, the piston 5 has lateral air jets 23 extending from the bore 6 through its walls to centralise the piston 5 in the bore 4 and to minimise friction.

Although it is preferred to introduce air into the device, any other suitable gas could be used.

In the embodiment above described, air pressure acting on the end of piston 5 urges the pad-like element 9 towards the roller surface with a force of about 10 Newtons, this force being counter balanced by the air cushion between the element 9 and the roller. If desired, however, the element may be urged towards the roller by the gravitational force of its own weight or by means of a suitable spring. However, it is preferred to use air pressure since a supply of air is already fed to the device to produce the air cushion and hence the force required to urge the element 9 towards the roller surface can be derived from this air supply. By suitably selecting the surface area of the pad, the size of the air passages 15 and the area of the pistons 3 and 5, the effect of air pressure variations can be eliminated.

In the above described embodiments, the pad-like element 9 is maintained at a distance of about 100 micro metres away from the roller surface. This distance is not particular critical but should preferably be not less than about 50 micro metres since if this is not the case ink may be caught up on the end face 11 of the element and restrict the flow of air through the air passages. Moreover, once this distance is selected it must be accurately maintained if the device is to hold its calibration. The end face 11 of the pad-like element 9 may be provided with an ink repellant coating to prevent ink adhering thereto.

The above embodiment is described in conjunction with a copper surfaced printing roller. Nevertheless, the device of the present invention can be used in conjunction with rollers having surfaces formed of other electrical conductive materials such as steel. Also, the device can be used to measure ink film thickness on surfaces other than actual printing surfaces.

As above described the transducer used is of the inductance type wherein its inductance varies in dependence on its proximity to electrically conductive material. If, however, the coating being gauged is a good dielectric, a transducer of the type having an electrical capacitance which varies in dependence on its proximity to electrically conductive material may be used and the coating thickness be measured in dependence upon the variation in capacitance in a manner analogous to that described above. This embodiment would not be satisfactory in measuring ink thickness during lithographic printing because of the variable water contamination of the ink.

Referring to FIG. 4, there is shown schematically a part of a lithographic printing machine. The printing machine comprises a driven printing roller or plate cylinder 31 carrying a printing plate (not shown). The printing machine also includes a means of applying ink to the printing roller 31 which means comprises an inking roller 32 in contact with the printing roller 31 and an ink roller train to feed ink to the inking roller 32. The ink roller train includes rollers 33 and 34, the remainder of the ink train rollers being omitted in the interests of clarity. The first roller of the ink train, the ink duct roller, is driven by means of a variable speed motor 35. A control unit 36 is provided to control the speed of the motor 35. This provides a means of regulating the supply of ink applied to the ink roller train in order to vary the thickness of the ink film on the printing roller 31. (In an alternative type of system, an intermediate roller in the system may be driven by the motor 35 in order to vary the thickness of the ink film on the roller 31). A device as shown in FIGS. 1 to 3 and denoted by reference numeral 37 is mounted adjacent an electrically conductive monitoring roller 38 in contact with the inking roller 32. The printing machine includes a means operably connecting the device 37 with the control unit 36 to cause the control unit 36 to regulate the speed of the motor 35 in dependence upon the amount of ink actually present on the roller 38 as determined by the device 37. This means is based on standard circuitry and comprises an error amplifier 39 and a means 40 of transmitting a reference signal to the amplifier 39. As hereinabove described the inductance of the coil of the device 37 causes a change in the frequency of an oscillator circuit and the frequency signal is converted to a voltage in the transducer read-out unit. This voltage is dependent on the actual thickness of the ink film on the roller 38 (and hence on the thickness of the ink film on the printing roller 31) and this voltage signal is fed into one of the inputs of the amplifier 39. A reference voltage signal is supplied to another input of the amplifier 39 by a potentiometer of the means 40. This reference voltage is indicated on a meter (not shown) and is set in dependence upon the desired thickness of the ink film on the roller 38.

The amplifier 39 includes a comparator to compare the voltage signal transmitted by the transducer read-out unit with the reference voltage signal and causes the control unit 36 to vary the speed of the motor 35 in dependence upon the difference between the signals so that should the device 37 indicate that too little ink is present the speed of the motor 35 is adjusted so that more ink is applied by the ink train rollers, and vice-versa.

We claim:

1. A method of determining the thickness of coating on the surface of a substrate, which method comprises:

i. effecting relative movement between the coated substrate and a displacement transducer having an electrical property which varies in dependence on its proximity to electrically conductive material,
   ii. supporting the transducer by means of a cushion of a gas so that the transducer is spaced from the surface of the coating of the relatively moving substrate by a constant distance and is spaced from a surface of an electrically conductive material by a distance which varies in dependence on the thickness of the coating of the relatively moving coated substrate, and;
   iii. measuring the variation in said electrical property of the transducer as the distance separating the transducer and the surface of electrically conductive material varies to obtain a measure of the thickness of the coating.

2. A method according to claim 1, wherein the surface of the substrate is formed of electrically conductive material and constitutes said surface of electrically conductive material.

3. A method according to claim 2, wherein said coating is an ink film.

4. A method according to claim 1, wherein the surface of the substrate is formed of non-electrically conductive material and wherein said surface of electrically conductive material is constituted by a surface additional to the surface of the substrate.

5. A method according to claim 1, wherein the transducer is an inductive type transducer and said electrical property is inductance.

6. A method according to claim 1, wherein the transducer is a capacitance type transducer and said electrical property is capacitance 7. A device for determining the thickness of a coating on the surface of a substrate, which device comprises;

i. a support member to be secured adjacent to the substrate.
ii. a pad-like element displaceable with respect to the member towards or away from the substrate, which element has a face provided with gas outlets and includes a transducer having an electrical property which is dependent upon its proximity to an electrically conductive material,
iii. a means of displacing the element with respect to the member towards the substrate, and
iv. a means of conducting gas to the discharge outlets to maintain the face of the element at a constant distance from the surface of the coating on the substrate.

8. A device as claimed in claim 7, wherein said supporting member is in the form of a tube, said element is secured to a piston axially slidable within the tube, said tube includes an inlet for the introduction of gas into the tube and arranged so that the gas introduced thereby acts on the piston and displaces the same, together with the element, towards the substrate, and said piston is provided with a longitudinally extending bore to conduct gas to the discharge outlets from the inlet.

9. A device as claimed in claim 8, wherein said piston is axially slidable within another piston which is axially slidable with respect to the tube and wherein the gas introduced through the inlet also acts on said another piston to displace said another piston towards the substrate in opposition to a means provided to displace said another piston away from the substrate.

10. A device as claimed in claim 9, wherein said bore is provided with lateral air jets whereby air passing through the lateral air jets serves to centralise said piston within said another piston.

11. A device as claimed in claim 7, wherein the transducer is an inductive type of transducer.

12. A device as claimed in claim 7, wherein the transducer is a capacitance type of transducer.

* * * * *